(12) United States Patent
Nakahara et al.

(10) Patent No.: US 6,743,848 B2
(45) Date of Patent: Jun. 1, 2004

(54) PIGMENT DISPERSING RESINS

(75) Inventors: Shuichi Nakahara, Hiratsuka (JP); Yoshiyuki Yukawa, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/223,626

(22) Filed: Aug. 20, 2002

(65) Prior Publication Data

US 2003/0125488 A1 Jul. 3, 2003

(30) Foreign Application Priority Data

Aug. 22, 2001 (JP) ...................................... 2001-252008

(51) Int. Cl.[7] .............................................. C08L 51/00
(52) U.S. Cl. ...................... 524/529; 524/556; 523/400; 523/402; 523/436; 428/413; 428/523
(58) Field of Search ................................ 428/413, 523; 523/400, 402, 436; 524/529, 556, 521; 525/65; 526/274, 277

(56) References Cited

U.S. PATENT DOCUMENTS

| | | | | |
|---|---|---|---|---|
| 5,955,532 A | * | 9/1999 | Chang et al. | 524/504 |
| 6,107,392 A | * | 8/2000 | Antonelli et al. | 524/504 |
| 6,174,953 B1 | * | 1/2001 | Huybrechts | 524/504 |
| 6,291,575 B2 | * | 9/2001 | Yukawa et al. | 524/521 |
| 6,548,174 B2 | * | 4/2003 | Nakajima et al. | 428/413 |
| 6,596,793 B2 | * | 7/2003 | Yamashita et al. | 524/99 |

* cited by examiner

*Primary Examiner*—Tatyana Zalukaeva
(74) *Attorney, Agent, or Firm*—Wenderoth, Lind&Ponack, LLP

(57) ABSTRACT

This invention provides a pigment dispersing resin having a weight-average molecular weight within a range of 1,000–150,000, which is obtained by copolymerizing a monomeric mixture comprising (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and (b) at least one copolymerizable unsaturated monomer, wherein at least one monomer among the ethylenically unsaturated monomer(s) constituting said macromonomer (a) and the copolymerizable unsaturated monomer(s) (b) has a functional group selected from substituted or unsubstituted amino group, quaternary ammonium salt group, sulfonic group, phosphoric group and carboxyl group.

29 Claims, No Drawings

PIGMENT DISPERSING RESINS

This invention relates to novel pigment dispersing resins excelling in pigment dispersing ability, pigment color developing ability and let down stability; to pigment dispersions formed by using the resins; and to paint compositions containing the pigment dispersions.

For paints, inks and the like in general, organic or inorganic pigments are widely used, for such purposes as coloring, shading, pleasant appearance and rust-proofing. Where these pigments are used in paints or inks, it occasionally occurs that dispersion stability of the pigments is insufficient, which leads to poor fluidability, shift in color phase or insufficient gloss of coatings formed of such paints. Heretofore numbers of proposals have been made to solve those problems.

For example, Japanese Patent Application Laid-Open Nos. 96175/1984, 36252/1990 and 81849/1998 proposed addition of pigment derivatives having identical skeletal structures with those of pigments, at the time of dispersing said pigments, or use of pigments which were treated with such pigment derivatives in advance. Processes according to such proposals, however, invariably show still insufficient pigment dispersing effect, and are subject to such defects as inferior in applicability for wide use because many kinds of pigment derivatives are necessary and also high production costs.

On the other hand, varieties of pigment dispersing agents are commercially available, such as acrylic resin type, polyester resin type, urethane resin type, polyester-modified urethane resin type and the like and they are finding wide use. Those commercially sold pigment dispersing agents, however, are subject to the problem that they cause deterioration in performance of coatings such as weatherability and other physical properties. In particular, when they are blended in paints in large quantities, deterioration in the coating performance becomes notable, and thus they are not fully satisfactory.

Moreover, automotive paint industries are facing in these recent years demands for high quality coating appearance achievable with high sharpness, transparency, high color-developing property and the like, of the levels which cannot be satisfied by presently available pigment dispersing resins or assistants in general, besides the conventional demands for the coating performances in respect of weatherability and other physical properties. It is also expected that increasingly wider varieties of coating colores will be required in the future, and hence development of corresponding pigment dispersing resins having the dispersing ability of those versatile coloring materials is required.

Still in addition, decrease in organic solvent content of paints to provide high solid content paints is an urgent responsibility of paint industries, for preservation of terrestrial environments. As means for providing higher solid content paints, studies have been made generally in the direction of decreasing molecular weights of resins for paint to reduce viscosity of paint preparations. Decrease in molecular weight of the resins, however, is apt to invite deterioration of curability or degradation in coating performances.

Also as a means for providing high solid content paint, increase in pigment concentration in paint (reduction in resin quantity to be used for dispersing a same amount of pigment) can be named, besides lowering molecular weight of resins for paint. Generally, however, attempts to achieve higher pigment concentration in paint are liable to invite increase in viscosity of pigment dispersions, mutual aggregation of pigments in pigment dispersions or paints, and furthermore aggravation in let down stability in occasions of formulating paints, rendering it difficult to obtain stable pigment dispersions or paints.

With the view to solve those problems, we have engaged in concentrative studies and now discovered that use of resins having specific functional groups, which resins are obtained through copolymerization reaction of a specific macromonomer with other copolymerizable unsaturated monomer or monomers, enables to provide pigment dispersions exhibiting markedly improved pigment dispersing ability, color developing property of pigment and let down stability also under high pigment concentration condition; and that paint compositions in which said pigment dispersions are used form coatings of superb finished appearance, weatherability and physical properties. This invention is whereupon completed.

Thus, the present invention provides a pigment dispersing resin ("pigment dispersing resin I") having a weight-average molecular weight within a range of 1,000–150,000, which is obtained by copolymerizing a monomeric mixture comprising (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and (b) at least one copolymerizable unsaturated monomer, wherein at least one monomer among the ethylenically unsaturated monomer(s) constituting said macromonomer (a) and the copolymerizable unsaturated monomer (s) (b) has a functional group selected from substituted or unsubstituted amino group, quaternary ammonium salt group, sulfonic group, phosphoric group and carboxyl group.

The invention also provides a pigment dispersing resin ("pigment dispersing resin II") having a weight-average molecular weight within a range of 1,000–150,000, which is obtained by copolymerizing a monomeric mixture comprising (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and (b) at least one copolymerizable unsaturated monomer, wherein at least one monomer among the ethylenically unsaturated monomer(s) constituting said macromonomer (a) and the copolymerizable unsaturated monomer (s) (b) has a group which is convertible to a functional group selected from substituted or unsubstituted amino group, quaternary ammonium salt group, sulfonic group, phosphoric group and carboxyl group, and then converting said convertible groups in the formed resin to corresponding functional groups.

The invention furthermore provides a pigment dispersing resin ("pigment dispersing resin III") containing long chain alkyl groups, which is obtained by introducing long chain alkyl groups into above pigment dispersing resin I or II.

The invention also provides a pigment dispersing resin ("pigment dispersing resin IV") having a weight-average molecular weight within a range of 1,000–150,000, which is obtained by copolymerizing a monomeric mixture comprising.

(c) a long chain alkyl group-containing macromonomer having a resin acid value less than 50 mgKOH/g, which is obtained by either subjecting a carboxyl-containing macromonomer and an epoxy-containing long chain alkyl compound to an esterification reaction, said carboxyl-containing macromonomer being obtained by copolymerizing a monomeric mixture comprising a carboxyl-containing unsaturated monomer and at least one other ethylenically unsaturated monomer in the presence of a metal complex as a catalytic chain transfer agent, or an addition cleavage-type chain transfer agent and if necessary a radical polymerization initiator; or by causing an epoxy-containing long chain alkyl compound to be concurrently present in said copolymerization reaction system to effect the copolymerization reaction and the esterification reaction at the same time, and (b) at least one copolymerizable unsaturated monomer, wherein at least one monomer among said macromonomer (c) and copolymerizable unsaturated monomer(s) (b) has a functional group selected from substituted or unsubstituted amino group, quaternary ammonium salt group, sulfonic group, phosphoric group and carboxyl group.

The invention moreover provides a pigment dispersion which comprises at least one of above pigment dispersing resins I–IV, pigment, solvent and if necessary a dispersion assistant.

The invention furthermore provides a paint composition which comprises above pigment dispersion.

Hereinafter we will explain the present invention in further details.

Pigment Dispersing Resin I

The pigment dispersing resin I according to the present invention is obtained by copolymerizing a monomeric mixture comprising macromonomer (a) and at least one copolymerizable unsaturated monomer (b), which are explained in the following.

Macromonomer (a)

Macromonomer (a) is a polymer containing polymerizable unsaturated groups, which is obtained by polymerizing at least one ethylenically unsaturated monomer in the presence of a metal complex which is a catalytic chain transfer agent, or an addition cleavage-type chain transfer agent, and if necessary a radical polymerization initiator.

Examples of said ethylenically unsaturated monomers include $C_1$–$C_{24}$, preferably $C_1$–$C_{18}$, linear, branched or cyclic alkyl esters of (meth)acrylic acid such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, cyclohexyl (meth)acrylate, isobornyl (meth)acrylate and tridecyl (meth)acrylate; epoxy-containing ethylenically unsaturated monomers such as glycidyl (meth)acrylate and 3,4-epoxycyclohexylmethyl (meth)acrylate; aromatic ethylenically unsaturated monomers such as styrene, vinyltoluene and α-methylstyrene; amino-containing ethylenically unsaturated monomers such as N,N-dimethylaminoethyl (meth)acrylate, N,N-diethylaminoethyl (meth)acrylate, N,N-dimethylaminopropyl (meth)acrylate, N-t-butylaminoethyl (meth)acrylate and N,N-dimethylaminobutyl (meth)acrylate; quaternary ammonium salt group-containing ethylenically unsaturated monomers such as methacryloyloxyethyltrimethylammonium chloride; sulfonic group-containing ethylenically unsaturated monomers such as 2-acrylamido-2-methylpropanesulfonic acid; phosphoric group-containing ethylenically unsaturated monomers such as acidophosphoxyethyl (meth)acrylate; hydroxyl-containing ethylenically unsaturated monomers such as hydroxyalkyl (meth)acrylates (preferably those whose hydroxyalkyl moiety contains 2 to 4 carbons) such as 2-hydroxyethyl (meth)acrylate, hydroxypropyl (meth)acrylate, 2,3-dihydroxybutyl (meth)acrylate, 4-hydroxybutyl (meth)acrylate or compounds formed by ring-opening-polymerization of above hydroxyalkyl (meth)acrylates with lactones such as ε-caprolactone, and monoesterified products of polyhydric alcohol with acrylic acid or methacrylic acid, such as polyethylene glycol mono (meth)acrylate; and carboxyl-containing ethylenically unsaturated monomers such as acrylic acid, methacrylic acid and half-esterified products of hydroxyalkyl (meth)acrylate with acid anhydride. These polymerizable unsaturated monomers can be used singly or in combination of two or more kinds of the monomers. As ethylenically unsaturated monomers, $C_1$–$C_{24}$ alkyl esters of methacrylic acid are particularly preferred, because they can synthesize the macromonomer with high efficiency.

In this specification, "(meth)acrylate" means "acrylate or methacrylate".

Where the macromonomer (a) is synthesized by a polymerization reaction in the presence of a catalytic chain transfer agent, the reaction is conducted by Catalytic Chain Transfer Polymerization process (which may hereafter be abbreviated as "CCTP process").

CCTP process is described in, for example, U.S. Pat. No. 4,694,054, U.S. Pat. No. 4,680,352, WO 95/04767, U.S. Pat. No. 5,721,330 and *Macromolecules,* 1996, 29, 8083–8089. Said macromonomer (a) can be obtained by these known CCTP processes. For instance, a macromonomer (a) can be obtained by catalytic chain transfer polymerization of an ethylenically unsaturated monomer, in the presence of a metal complex which is a catalytic chain transfer agent and if necessary a radical polymerization initiator, using such means as solution polymerization in an organic solvent.

As examples of the metal complex used as catalytic chain transfer agent in said polymerization, cobalt complex, iron complex, nickel complex, ruthenium complex, rhodium complex, palladium complex, rhenium complex and iridium complex may be named. Of those, cobalt complex is preferred because it acts as a catalytic chain transfer agent very effectively. In particular, a cobalt complex expressed by the following (formula 1) can be conveniently used.

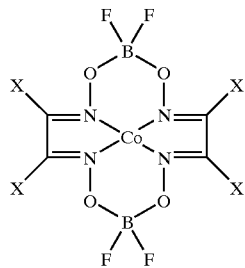

(formula 1)

in which four X's are same or different and each stands for hydrogen atom or a $C_1$–$C_{10}$ hydrocarbon group, or two X's binding to adjacent carbons may form, together with said adjacent carbons, a $C_4$–$C_{20}$ hydrocarbon ring. It is particularly preferred that X is methyl or phenyl group.

As typical examples of the cobalt complexes represented by above (formula 1), bis(borondifluorodialkylglyoximate)

Co(II) complex, bis(borondifluorodi(optionally substituted) phenylglyoximate) Co(II) complex and the like may be named. Of these, readily available bis(borondifluorodimethylglyoximate) Co(II) complex and bis(borondifluorodiphenylglyoximate) Co(II) complex can be used with particular convenience.

The use rate of such metal complex as a catalytic chain transfer agent is not subject to specific limitation, while it is usually suitable that the use rate falls within a range of $1\times10^{-6}$–1 part by weight, preferably $1\times10^{-4}$–0.5 part by weight, per 100 parts by weight of the total of ethylenically unsaturated monomer(s) used for synthesizing a macromonomer (a).

For adjusting reactivity or improving solubility of such a metal complex, if necessary known coordination compound may be added to the reaction system. Examples of such coordination compound include phosphorus compounds such as triphenylphosphine and tributylphosphine; amine compounds such as pyridine and tributylamine; hydroxyl-containing compounds such as methanol and ethylene glycol; ketones such as acetone and methyl ethyl ketone; esters such as ethyl acetate and butyl acetate; and water.

Macromonomer (a) can also be prepared by using an addition cleavage-type chain transfer agent, instead of catalytic chain transfer agent. Where an addition cleavage-type chain transfer agent is used, the polymerization reaction is conducted by radical addition cleavage-type chain transfer polymerization. As such addition cleavage-type chain transfer agent, for example, 2,4-diphenyl-4-methyl-1-pentene (may be briefly called as "α-methylstyrene dimer") may be named. The use rate of addition cleavage-type chain transfer agent is not critical, but it is usually adequate that the rate falls within a range of 0.1–75 parts by weight, in particular, 1–50 parts by weight, per 100 parts by weight of the total ethylenically unsaturated monomer(s) used for synthesizing the macromonomer (a).

A macromonomer (a) can be formed by polymerizing at least one ethylenically unsaturated monomer by such means as solution polymerization in an organic solvent, in the presence of said metal complex which is a catalytic chain transfer agent, or said addition cleavage-type chain transfer agent and if necessary a radical polymerization initiator.

As radical polymerization initiators which may be used in polymerization of said macromonomer (a) as individual occasion demands, for example, the following may be named: organic peroxide polymerization initiators including ketone peroxides such as cyclohexanone peroxide, 3,3,5-trimethylcyclohexanone peroxide and methylcyclohexanone poroxide; peroxyketals such as 1,1-bis(tert-butylperoxy)-3,3,5-trimethylcyclohexane, 1,1-bis(tert-butylperoxy)cyclohexane and n-butyl-4,4-bis(tert-butylperoxy)valerate; hydroperoxides such as cumene hydroperoxide and 2,5-dimethylhexane-2,5-dihydroperoxide; dialkylperoxides such as 1,3-bis(tert-butylperoxy-m-isopropyl)benzene, 2,5-dimethyl-2,5-di(tert-butylperoxy)hexane, diisopropylbenzene peroxide, tert-butylcumyl peroxide, di-tert-amyl peroxide, di-tert-hexyl peroxide and di-tert-butyl peroxide; diacyl peroxides such as decanoyl peroxide, lauroyl peroxide, benzoyl peroxide and 2,4-dichlorobenzoyl peroxide; peroxy carbonates such as bis(tert-butylcyclohexyl) peroxycarbonate; and peroxy esters such as tert-butylperoxybenzoate, 2,5-dimethyl-2,5-di(benzoylperoxy) hexane and tert-butyl-peroxyisopropylcarbonate: and azo polymerization initiators including 2,2'-azobisisobutyronitrile, 2-2'-azobis(2-methylbutyronitrile), 1,1-azobis(cyclohexane-1-carbonitrile), azocumene-2,2'-azobismethylvaleronitrile, 4,4'-azobis(4-cyanovaleric acid), dimethyl 2,2'-azobis(2-methylpropionate) and 2,2'-azobis(2,4,4-trimethylpentane). The use rate of these radical polymerization initiators is not critical, while usually it is desirably within a range of 0.1–15 parts by weight, in particular, 0.3–10 parts by weight, per 100 parts by weight of the total of ethylenically unsaturated monomer(s) used for synthesizing the intended macromonomer (a).

As polymerization methods for obtaining macromonomer (a) by above-described CCTP process or radical addition cleavage-type chain transfer polymerization, solution polymerization in organic solvent, emulsion polymerization in water and the like can be used, of which solution polymerization is preferred. The polymerization can be usually conducted at around 80–200° C., by heating the system under stirring for normally about 1–10 hours.

As the organic solvent, hydrocarbon solvents such as heptane, toluene, xylene, octane and mineral spirit; ester solvents such as ethyl acetate, n-butyl acetate, isobutyl acetate, ethylene glycol monomethyl ether acetate, diethylene glycol monobutyl ether acetate and 3-ethoxyethyl propionate; ketone solvents such as methyl ethyl ketone, methyl isobutyl ketone, diisobutyl ketone and cyclohexanone; alcohol solvents such as methanol, ethanol, isopropanol, n-butanol, sec-butanol, isobutanol and methoxypropanol; ether solvents such as n-butyl ether, dioxane, ethylene glycol monomethyl ether and ethylene glycol monoethyl ether and the like; and aromatic petroleum solvents such as Swasol™ 310, Swasol™ 1000 and Swasol™ 1500 of Cosmo Oil Co., Ltd. may be named. Those organic solvents can be used either singly or in combination of two or more. At the time of polymerization, the organic solvent is normally used in an amount not more than 400 parts by weight based on the total weight of the monomer components.

So obtained macromonomer (a) preferably has an acid value less than 50 mgKOH/g, in particular, not more than 40 mgKOH/g, and a weight-average molecular weight within a range of 300–15,000, in particular, 500–10,000, inter alia, 1,000–10,000, to exhibit favorable pigment dispersion stability.

Copolymerizable Unsaturated Monomer (b)

Copolymerizable unsaturated monomer (b) is subject to no particular limitation, so long as it is an unsaturated monomer copolymerizable with above macromonomer (a). As specific examples of copolymerizable unsaturated monomer (b), those monomers which are earlier named as examples of ethylenically unsaturated monomers to be used for production of above macromonomer (a) can be named.

Pigment dispersing resin I according to the present invention can be produced by copolymerizing a mixture which comprises above-described macromonomer (a) and copolymerizable unsaturated monomer(s) (b). Here at least one monomer among those ethylenically unsaturated monomer (s) constituting said macromonomer (a) and copolymerizable unsaturated monomer(s) (b) must have functional group (s) selected from substituted or unsubstituted amino group, quaternary ammonium salt group, sulfonic group, phosphoric group and carboxyl group. Specific examples of monomers having said functional groups include amino-containing ethylenically unsaturated monomers such as N,N-dimethylaminoethyl (meth)acrylate, N,N-diethylaminoethyl (meth)acrylate, N,N-dimethylaminopropyl (meth)acrylate, N-t-butylaminoethyl (meth) acrylate and N,N-dimethylaminobutyl (meth) acrylate; quaternary ammonium salt group-containing ethylenically unsaturated monomers such as methacryloyloxyethyltrimethylammonium chloride; sulfonic group-containing ethylenically unsaturated monomers such as 2-acrylamido-2-methylpropanesulfonic acid; phosphoric group-containing ethylenically unsaturated monomers such as acidophosphoxyethyl (meth)acrylate; and carboxyl-containing ethylenically unsaturated monomers such as acrylic acid, methacrylic acid and half-esterified products of hydroxyalkyl (meth)acrylate with acid anhydride. Of those, carboxyl-containing unsaturated monomers are preferred.

As methods for copolymerizing a mixture of above macromonomer (a) and copolymerizable unsaturated monomer (s) (b), solution polymerization in organic solvent and emulsion polymerization in water may be used, solution polymerization being preferred. Usually the copolymerization can be conducted at temperatures around 80–200° C. by heating the system under stirring usually for about 1–10 hours. As the organic solvent, those named as the organic solvents useful in the occasion of preparing macromonomer (a) by solution polymerization can be similarly used.

In said copolymerization reaction of a mixture of macromonomer (a) with copolymerizable unsaturated monomer (s) (b), the blend ratio between the macromonomer (a) and copolymerizable unsaturated monomer(s) (b) preferably falls within the following ranges based on the total amount of the two, for favorable pigment dispersion stability:

macromonomer (a): 0.1–99.9 wt %, preferably 1–99 wt %, inter alia, 10–90 wt % copolymerizable unsaturated monomer(s) (b): 0.1–99.9 wt %, preferably 1–99 wt %, inter alia, 10–90 wt %.

Thus obtained pigment dispersing resin I contains functional group(s) selected from substituted or unsubstituted amino group, quaternary ammonium salt group, sulfonic group, phosphoric group and carboxyl group, preferably at a combined concentration within a range of 0.01–10 equivalents/kg resin, in particular, 0.05–7.5 equivalents/kg resin, inter alia, 0.1–5 equivalents/kg resin for favorable pigment dispersion stability. Hence it is convenient to so select the kinds and amounts of ethylenically unsaturated monomers constituting the macromonomer (a) and those of copolymerizable unsaturated monomer(s) (b) that the functional group concentration in resulting pigment dispersing resin I may fall within the above-specified range. It is also preferred for pigment dispersing resin I to have an weight-average molecular weight falling within a range of 1,000–150,000, preferably 2,000–100,000, inter alia, 3,000–50,000, for favorable pigment dispersion stability.

Pigment Dispersing Resin II

Pigment dispersing resin II is obtained by synthesizing macromonomer (a) and copolymerizing this macromonomer (a) with copolymerizable unsaturated monomer(s) (b) in the manner similar to those in production of pigment dispersing resin I, except that replacing at least a part of the monomer (s) having functional group(s) selected from substituted or unsubstituted amino group, quaternary ammonium salt group, sulfonic group, phosphoric group and carboxyl group, among those ethylenically unsaturated monomer(s) con stituting macromonomer (a) and/or copolymerizable unsaturated monomer(s) (b) which are used for production of pigment dispersing resin I, with monomer(s) containing group(s) convertible to functional group(s) selected from substituted or unsubstituted amino group, quaternary ammonium salt group, sulfonic group, phosphoric group and carboxyl group; and then converting said convertible groups present in the resulting resin to the functional groups.

As such groups which are convertible to said functional groups, for example, epoxy group and hydroxyl group may be named, and as typical examples of monomers having groups that are convertible to these functional groups, glycidyl (meth)acrylate, 3,4-epoxycyclohexyl (meth)acrylate, allyl glycidyl ether, 2-hydroxyethyl (meth)acrylate, hydroxypropyl (meth)acrylate and 4-hydroxybutyl (meth)acrylate may be named. Of those, unsaturated monomers having groups convertible to carboxyl group, in particular, hydroxyl-containing unsaturated monomers, are preferred.

Conversion of such convertible groups to said functional groups can be conducted by methods which are known per se. For example, epoxy groups can be converted to secondary or tertiary amino groups upon reacting with primary or secondary amino compounds; or to quaternary ammonium salt group upon reacting with tertiary amine compound and acid; or to sulfonic group by reacting with metal hydrogensulfite; or to phosphoric group by reacting with phosphoric acid compound. Whereas, hydroxyl group is convertible to carboxyl group through half-esterifying reaction with acid anhydride. Upon such conversions the intended pigment dispersing resin II can be prepared.

Thus obtained pigment dispersing resin II contains functional group(s) selected from substituted or unsubstituted amino group, quaternary ammonium salt group, sulfonic group, phosphoric group and carboxyl group, preferably at a combined concentration within a range of 0.01–10 equivalents/kg resin, in particular, 0.05–7.5 equivalents/kg resin, inter alia, 0.1–5 equivalents/kg resin, for favorable pigment dispersion stability. Hence it is convenient to so select the kinds and amounts of ethylenically unsaturated monomer(s) constituting the macromonomer (a) and those of copolymerizable unsaturated monomer(s) (b) that the functional group concentration in resulting pigment dispersing resin II may fall within the above-specified range. It is also preferred for pigment dispersing resin II to have an weight-average molecular weight within a range of 1,000–150,000, preferably 2,000–100,000, inter alia, 3,000–50,000, for favorable pigment dispersion stability.

Pigment Dispersing Resin III

Above-described pigment dispersing resin I or II can be converted to long chain alkyl-containing pigment dispersing resin III, by introducing thereinto long chain alkyl groups, in particular, $C_6$–$C_{24}$, preferably $C_8$–$C_{20}$, inter alia, $C_8$–$C_{15}$, linear or branched alkyl groups. Introduction of long chain alkyl groups into pigment dispersing resin can improve its compatibility with resins for paints such as base resin.

Introduction of long chain alkyl groups into pigment dispersing resin I or II can be readily conducted by reacting with said resin a compound having a functional group reactable with the functional group in said resin and a long chain alkyl group.

For example, where a pigment dispersing resin I or II has carboxyl groups, long chain alkyl groups can be introduced into said resin by esterification reaction of an epoxy-containing long chain alkyl compound with at least a part of the carboxyl groups present in the carboxyl-containig resin, to produce a long chain alkyl-containing pigment dispersing resin (which method may hereafter be referred to as "method-1"). Alternatively, in the course of producing above-described pigment dispersing resin I, where at least one monomer among the ethylenically unsaturated monomers constituting macromonomer (a) and copolymerizable unsaturated monomer(s) (b) is carboxyl-containing unsaturated monomer, an epoxy-containing long chain alkyl compound may be caused to be concurrently present in the copolymerization reaction system of the monomeric mixture comprising said macromonomer (a) and copolymerizable unsaturated monomer(s) (b), to effect an esterification reaction concurrently with the copolymerization reaction, whereby introducing long chain alkyl groups into the resin to provide a long chain alkyl-containing pigment dispersing resin ("method-2").

As said epoxy-containing long chain alkyl compound, a compound having one epoxy group and at least one, preferably one, long chain alkyl group, per molecule, is convenient, typical examples of which include Cardura™ E10 (Japan Epoxy Resin Co., Ltd., glycidyl ester of $C_9$–$C_{11}$ branched higher fatty acid) and 2-ethylhexylglycidyl ether.

In the above method-1, the blend ratio of pigment dispersing resin I or II and an epoxy-containing long chain alkyl compound is not strictly limited, but generally it is suitable to use not more than 60 parts by weight, in particular, 1–50 parts by weight, inter alia, 1–40 parts by weight, of an epoxy-containing long chain alkyl compound, per 100 parts by weight of pigment dispersing resin I or II, from the viewpoint of pigment dispersing ability of resulting resin.

The esterification in above method-1 can be effected by reacting pigment dispersing resin I or II with such an epoxy-containing long chain alkyl compound, if necessary in the presence of organic solvent, usually at the reaction temperature around 100–150° C. In that occasion, use of a tertiary amine such as N,N-dimethyllaurylamine, N,N-dimethyldodecylamine or the like as a catalyst is preferred.

In the above method-2, on the other hand, it is convenient to blend an epoxy-containing long chain alkyl compound in the occasion of effecting the esterification reaction concurrently with the copolymerization reaction, in an amount within a range of not more than 60 parts by weight, in particular, 1–50 parts by weight, inter alia, 1–40 parts by weight, per 100 parts by weight of the monomeric mixture comprising macromonomer (a) and copolymerizable unsaturated monomer(s) (b), from the viewpoint of pigment dispersing ability of the resulting resin. For promoting this esterification reaction, use of tertiary amines like above-named as the catalyst is preferred.

Thus obtained long chain alkyl-containing pigment dispersing resin III, similarly to pigment dispersing resin I or II, contains functional group(s) selected from substituted or unsubstituted amino group, quaternary ammonium salt group, sulfonic group, phosphoric group and carboxyl group, preferably at a combined concentration within a range of 0.01–10 equivalents/kg resin, in particular, 0.05–7.5 equivalents/kg resin, inter alia, 0.1–5 equivalents/kg resin, for favorable pigment dispersion stability. Hence it is convenient to so select the kinds and amounts of ethylenically unsaturated monomer(s) constituting the macromonomer (a), those of copolymerizable unsaturated monomer(s) (b) and the introduced amount of long chain alkyl groups, that the functional group concentration in resulting pigment dispersing resin III may fall within the above-specified range. Said pigment dispersing resin III, similarly to pigment dispersing resin I or II, may have an weight-average molecular weight within a range of 1,000–150,000, preferably 2,000–100,000, inter alia, 3,000–50,000. Furthermore, it is generally convenient that the long chain alkyl group content of pigment dispersing resin III falls within a range of 1–30 parts by weight, in particular, 1–20 parts by weight, based on 100 parts by weight of solid content of pigment dispersing resin III, for favorable pigment dispersion stability.

Pigment Dispersing Resin IV

Pigment dispersing resin IV according to the present invention can be obtained by the steps of synthesizing a carboxyl-containing macromonomer in the manner similar to the case of pigment dispersing resin I except using a carboxyl-containing unsaturated monomer as a part of ethylenically unsaturated monomer(s) constituting said macromonomer (a), i.e., copolymerizing a monomeric mixture comprising this carboxyl-containing unsaturated monomer and at least one other ethylenically unsaturated monomer; and then subjecting this macromonomer and an epoxy-containing long chain alkyl compound to an esterification reaction: or causing an epoxy-containing long chain alkyl compound to be concurrently present in the copolymerization system to effect the esterification reaction concurrently with the copolymerization reaction to provide a long chain alkyl group-containing macromonomer (c), and thereafter copolymerizing a monomeric mixture comprising this macromonomer (c) and at least one copolymerizable unsaturated monomer (b).

As above epoxy-containing long chain alkyl compound, those similar to the epoxy-containing long chain alkyl compounds useful in the production of above-described pigment dispersing resin III can be named as examples.

The blend ratio between the carboxyl-containing macromonomer and the epoxy-containing long chain alkyl compound is not strictly limited, while generally it is adequate from the viewpoint of pigment dispersibility that the epoxy-containing long chain alkyl compound is present within a range not more than 60 parts by weight, in particular, 1–50 parts by weight, inter alia, 1–30 parts by weight, per 100 parts by weight of said carboxyl-containing macromonomer.

Where the epoxy-containing long chain alkyl compound is caused to be concurrently present in the copolymerization reaction system, it is suitable that its amount falls within a range not more than 60 parts by weight, in particular, 1–50 parts by weight, inter alia, 1–30 parts by weight, per 100 parts by weight of the monomeric mixture for preparing the macromonomer.

Said esterification reaction can be conducted by reacting the carboxyl-containing macromonomer with the epoxy-containing long chain alkyl compound, if necessary in the presence of an organic solvent, usually at the reaction temperature of around 100–150° C. In that occasion, use of a tertiary amine such as N,N-dimethyllaurylamine or N,N-dimethyldodecylamine as a catalyst is preferred.

So obtained macromonomer (c) preferably has an acid value less than 50 mgKOH/g, in particular, not more than 40 mgKOH/g, and a weight-average molecular weight within a range of 300–15,000, in particular, 500–10,000, inter alia, 1,000–10,000, for favorable pigment dispersion stability.

Pigment dispersing resin IV according to the present invention is prepared by copolymerizing a monomeric mixture comprising thus formed long chain alkyl-containing macromonomer (c) and at least one copolymerizable unsaturated monomer (b).

Above copolymerizable unsaturated monomer(s) (b) may be similar to those copolymerizable unsaturated monomer(s) (b) that are used in the production of pigment dispersing resin I according to the present invention.

In the occasion of copolymerizing said macromonomer (c) with copolymerizable unsaturated monomer(s) (b), the blend ratio of the two preferably is within the following ranges, for favorable pigment dispersion stability:

macromonomer (c): 0.1–99.9 wt %, preferably 1–99 wt %, inter alia, 5–90 wt % copolymerizable Unsaturated Monomer(s) (b): 0.1–99.9 wt %, preferably 1–99 wt %, inter alia, 5–90 wt %.

As the polymerization method for effecting copolymerization reaction of a mixture of macromonomer (c) and copolymerizable unsaturated monomer(s) (b), those similar to the polymerization methods for copolymerizing a mixture of macromonomer (a) and copolymerizable unsaturated monomer(s) (b) in production of pigment dispersing resin I may be used.

Thus obtained pigment dispersing resin IV containing long chain alkyl group contains, similarly to pigment dispersing resin I or II, functional group(s) selected from substituted or unsubstituted amino group, quaternary ammonium salt group, sulfonic group, phosphoric group and carboxyl group, preferably at a combined concentration within a range of 0.01–10 equivalents/kg resin, in particular, 0.05–7.5 equivalents/kg resin, inter alia, 0.1–5 equivalents/kg resin for favorable pigment dispersion stability. Hence it is convenient to so select the kinds and amounts of ethylenically unsaturated monomers constituting the macromonomer (c), those of copolymerizable unsaturated monomer(s) (b) and introduced amount of long chain alkyl groups that the functional group concentration in resulting pigment dispersing resin IV may fall within the above-specified range. Said pigment dispersing resin IV may have an weight-average molecular weight falling within a range of 1,000–150,000, preferably 2,000–100,000, inter alia, 3,000–250,000, similarly to pigment dispersing resin I or II. Furthermore, it is generally preferred that the long chain alkyl group content of pigment dispersing resin IV falls within a range of 1–30 parts by weight, in particular, 1–20 parts by weight, based on 100 parts by weight of solid content of pigment dispersing resin IV, for favorable pigment dispersion stability.

Pigment Dispersions

Pigment dispersion resins I–IV of the present invention contain in their molecules those monomers having functional groups selected from substituted or unsubstituted amino group, quaternary ammonium salt group, sulfonic group, phosphoric group and carboxyl group, and hence excel in adsorption onto pigment surfaces, can prevent aggregation among pigments in pigment dispersions and impart thereto dispersion stability. For example, pigment dispersing resins of the present invention having tertiary amino groups or quaternary ammonium salt groups particularly excel in dispersion stability of acidic or neutral pigments, and pigment dispersing resins of the invention having sulfonic, phosphoric or carboxyl groups particularly excel in dispersion stability of basic pigments. The amount of these functional groups in pigment dispersing resins of the invention can be suitably selected within the earlier specified range, according to the kind of pigment to be dispersed, specific surface area of pigment particles, particle diameters, use or non-use of pigment surface treating agent, polarity of dispersant, etc.

Therefore, those pigment dispersing resins of the present invention can be broadly used for dispersing various kinds of pigments.

Thus, according to the present invention, pigment dispersions containing at least one of pigment dispersing resins I–IV of the present invention, pigment, solvent (dispersing medium) and if necessary a dispersing assistant are provided.

As the pigments, those usually used in the field of paints and inks, for example, bright pigments such as aluminium powder, coppoer powder, nickel powder, stainless steel powder, chromium powder, micaceous iron oxide, titanium dioxide-coated mica powder, iron oxide-coated mica powder and bright graphite: organic coloring pigments, e.g., organic red pigments such as Pink EB, azo- and quinacridone pigments; organic blue pigments such as cyanine blue and Indanthrene Blue; organic green pigments such as cyanine green; organic yellow pigments such as benzimidazolone-, isoindolin- and quinophthalone pigments: inorganic coloring pigments such as titanium white, titanium yellow, iron red, carbon black, chrome yellow, iron oxide; and various calcined pigments may be named.

Blend ratios of these pigments are not subject to specific limitations, while they are normally within a range of 10–3,000, preferably 15–2,000, inter alia 15–1,800 parts, per 100 parts of a pigment dispersing resin or resins of the present invention, parts being by weight, in consideration of pigment dispersing ability, dispersion stability and color developing property of resulting pigment dispersions.

As the solvent, any organic solvent capable of dissolving pigment dispersing resins can be used without particular limitation, specific examples including hydrocarbon solvents such as toluene, xylene and mineral spirit; ester solvents such as ethyl acetate, n-butyl acetate, isobutyl acetate, ethylene glycol monomethyl ether acetate and diethylene glycol monobutyl ether acetate; ether solvents such as n-butyl ether, dioxane, ethylene glycol monomethyl ether, ethylene glycol monoethyl ether, ethylene glycol monobutyl ether and diethylene glycol; ketone solvents such as methyl ethyl ketone, methyl isobutyl ketone and diisobutyl ketone; alcohol solvents such as methanol, ethanol, isopropanol, n-butanol, sec-butanol and isobutanol; and aromatic petroleum solvents such as Swasol™ 310, Swasol™ 1000 and Swasol™ 1500 of Cosmo Oil Co., Ltd. Those organic solvents can be used either singly or in combination of two or more.

As dispersion assistants, which are used as occasions demand, for example, Solsperse™ 24000 GR (AVECIA Ltd.) and Disper™ BYK-160 (BYK Chemie International GmbH) may be named.

Those pigment dispersions can be prepared by mixing the foregoing ingredients and stirring the mixtures to homogeneity, for example, with paint shaker, homogenizer, sand mill and the like.

Resulting pigment dispersions excel in dispersion stability of pigments and can be advantageously used for formulation of paints.

Paint Compositions

Said pigment dispersions which are provided by the present invention can be blended with binder resin for paint and, as occasions demand, with other additives for paint such as solvent, curing catalyst, rheology control agent such as fine polymer particles, ultraviolet absorber, ultraviolet stabilizer, coated surface-regulating agent, antioxidant, silane coupling agent and the like, to provide paint compositions.

Said binder resins for paint usually encompass base resins useful for paints, or combination of such resins with curing agents. Examples of such base resin include hydroxyl-containing acrylic resin, hydroxyl-containing polyester resin, epoxy resin, epoxy-containing acrylic resin, carboxyl-containing high acid value polyester resin and carboxyl-containing high acid value acrylic resin. As the curing agent, for example, amino resins and optionally blocked polyisocyanate compounds may be named.

As said binder resins for paint, in particular, combinations of at least one base resin selected from hydroxyl-containing acrylic resins and hydroxyl-containing polyester resins with at least one curing agent selected from amino resins and optionally blocked polyisocyanate compounds; and combinations of at least one resin selected from epoxy resins and epoxy-containing acrylic resins with at least one carboxyl-containing resin selected from high acid value polyester resins and high acid value acrylic resins, can be conveniently used.

As said solvent which is used when necessary, various solvents which can dissolve or disperse said binder resins for paint and pigment dispersing resins and which are similar to those named as examples of solvent in said pigment dispersions can be used.

As the curing catalyst, where optionally blocked polyisocyanate compound is selected as the curing agent, dibutyltin diacetate, dibutyltin dioctate, dibutyltin dilaurate, triethylamine, diethanolamine and the like may be used; and where amino resins such as melamine resin is used as the curing agent, sulfonic acid compounds such as paratoluenesulfonic acid, dodecylbenzenesulfonic acid, or amine-neutralized products of these sulfonic acid compounds may be named.

Fine polymer particles which are used as rheology control agent are provided by a polymer which does not dissolve in paint compositions but disperses as fine particles. Suitable average particle size normally is within a range of 0.01–1 μm. Inside of the fine polymer particles may either be crosslinked or not, the former being preferred. Such fine polymer particles are known per se, and may be suitably selected from marketed products. As rheology control agent, diurea-type, polyamide-type and inorganic fine particles may also be used, besides such fine polymer particles.

As the ultraviolet absorber, for example, compounds derived from benzophenone, benzotriazole, cyanoacrylate, salicylate and oxalanilide may be named. As ultraviolet stabilizer, for example, hindered amine compounds may be named.

Paint compositions of the present invention can be prepared by suitably selecting above-described ingredients and combining them according to intended use of individual paints, and homogeneously mixing them.

Hereinafter the invention is explained in further details, referring to production examples, working examples and comparative examples, in which parts and percentages are by weight unless otherwise specified.

Production of Macromonomers

PRODUCTION EXAMPLE 1

An ordinary reaction vessel for producing acrylic resin, which was equipped with a stirrer, thermometer, a reflux condensing tube and the like accessories was charged with 30 parts of ethylene glycol monobutyl ether and 9 parts of 2,4-diphenyl-4-methyl-1-pentene which were heated under stirring. When the temperature of the mixture reached 150° C., a mixture of following monomers, etc. was added dropwise over a period of following 3 hours:

| | |
|---|---|
| n-butyl methacrylate | 92.5 parts |
| methacrylic acid | 7.5 parts |
| ethylene glycol monobutyl ether | 5 parts |
| di-tert-butyl peroxide | 1 part |

After the dropwise addition ended, the system was aged at 150° C. for 1.5 hours, then the temperature was lowered to 120° C. and an additional liquid catalyst mixture of 5 parts of n-butyl acetate and 0.5 part of azobisisobutyronitrile was dripped thereinto consuming an hour, followed by an hour's aging at 120° C. After said aging, the system was cooled to provide a macromonomer (M-1) solution of a solid content 65%. Thus obtained macromonomer (M-1) had a resin acid value of about 49 mgKOH/g and a weight-average molecular weight of about 4,800.

PRODUCTION EXAMPLE 2–13

Production Example 1 was repeated except that the composition of blended components was varied for each run as indicated in the following Table 1, to obtain solutions of macromonomers (M-2)–(M-13). The solid content of each macromonomer solution and resin acid value and weight-average molecular weight of each macromonomer were as shown in Table 1. (Note) in Table 1 has the following significance.

(note 1) Placcel FM-3X: tradename, Daicel chemical Industries, Ltd., a methacrylic acid ester having a polyester chain resulting from ring-opening of ε-caprolactone.

PRODUCTION EXAMPLE 14

An ordinary reaction vessel for producing acrylic resins, which was equipped with a stirrer, thermometer, a nitrogen-inlet pipe, a reflux condensing tube and the like accessories was charged with 72 parts of methoxypropanol, which was heated under stirring and maintained at 105° C. while nitrogen-substituting the inside atmosphere of the reaction vessel. Into the vessel then a mixture formed of 60 parts of isobutyl methacrylate, 40 parts of "Placcel FM-3X", 1 part of azobisisobutyronitrile, 5 parts of methoxypropanol and 0.008 part of bis(borondifluorodimethylglyoximate) Co (II) was added dropwise over a period of 3 hours. After the addition was over, the system was aged for 30 minutes at 105° C. Then an additional liquid catalyst mixture composed of 10 parts of methoxypropanol and 0.5 part of azobisisobutyronitrile was dripped over an hour, followed by aging at 105° C. for an hour. Cooling the system, a macromonomer (M-14) solution with a solid content of 65% was obtained. Said macromonomer (M-14) had a weight-average molecular weight of about 5,000.

Solid contents of the solutions of macromonomers (M-1 to M-14) as obtained in the foregoing production examples, and resin acid values and weight-average molecular weights of the macromonomers were as shown in the following Table 1.

TABLE 1

| | | Production Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | Macromonomer | M-1 | M-2 | M-3 | M-4 | M-5 | M-6 | M-7 | M-8 | M-9 | M-10 | M-11 | M-12 | M-13 | M-14 |
| Initial feed in reaction vessel | ethylene glycol monobutyl ether | 30 | 30 | 30 | 30 | 30 | 30 | 30 | 30 | 30 | 30 | 30 | 30 | 30 | |
| | methoxypropanol | | | | | | | | | | | | | | 72 |
| | 2,4-diphenyl-4-methyl-1-pentene | 9 | 6 | 9 | 9 | 7 | 3 | 5 | 4 | 7 | 10 | 10 | 4 | 9 | |
| Mixture of monomers, etc. to be | n-butyl methacrylate | 92.5 | | | | | | | 80 | | | 90 | | 82.5 | |
| | isobutyl methacrylate | | 60 | 80 | 50 | | | | | 20 | | 74 | | 16 | 60 |
| | 2-ethylhexyl methacrylate | | | | | 80 | 20 | | | | | | | | |

TABLE 1-continued

| | Macromonomer | Production Example 1 M-1 | 2 M-2 | 3 M-3 | 4 M-4 | 5 M-5 | 6 M-6 | 7 M-7 | 8 M-8 | 9 M-9 | 10 M-10 | 11 M-11 | 12 M-12 | 13 M-13 | 14 M-14 |
|---|---|---|---|---|---|---|---|---|---|---|---|---|---|---|---|
| added dropwise | lauryl methacrylate | | | | | | | | | 60 | | | | | |
| | 2-hyroxyethyl methacrylate | | | 20 | 50 | 20 | | 20 | | | 40 | 20 | 10 | | |
| | Placcel FM-3X (note 1) | | 40 | | | | 80 | | 80 | | | | 80 | | 40 |
| | methacrylic acid | 7.5 | | | | | | | | | 6 | | 4 | 7.5 | |
| | di-tert-butyl peroxide | 1 | 1 | 1 | 1 | 1 | 1 | 1 | 1 | 1 | 1 | 1 | 1 | 1 | |
| | azobisisobutyronitrile | | | | | | | | | | | | | | 1 |
| | bis(boron difluorodimethyl-glyoximate) CoII | | | | | | | | | | | | | | 0.08 |
| | ethylene glycol monobutyl ether | 5 | 5 | 5 | 5 | 5 | 5 | 5 | 5 | 5 | 5 | 5 | 5 | | |
| | methoxypropanol | | | | | | | | | | | | | | 5 |
| Additional liquid catalyst mixture | n-butyl acetate | 5 | 5 | 5 | 5 | 5 | 5 | 5 | 5 | 5 | 5 | 5 | 5 | 5 | |
| | methoxypropanol | | | | | | | | | | | | | | 5 |
| | azobisisobutyronitrile | 0.5 | 0.5 | 0.5 | 0.5 | 0.5 | 0.5 | 0.5 | 0.5 | 0.5 | 0.5 | 0.5 | 0.5 | 0.5 | 0.5 |
| Numerical property values | solid content (%) | 65 | 65 | 65 | 65 | 65 | 65 | 65 | 65 | 65 | 65 | 65 | 65 | 65 | 65 |
| | resin acid value (mgKOH/g) | 45 | 0 | 0 | 0 | 0 | 0 | 0 | 0 | 0 | 83 | 90 | 25 | 25 | 0 |
| | weight-average molecular weight | 4800 | 6800 | 4900 | 4800 | 6200 | 12300 | 8300 | 10800 | 6400 | 4500 | 4500 | 9700 | 5000 | 5000 |

Preparation of Pigment Dispersing Resins

EXAMPLE 1

An ordinary reaction vessel for producing acrylic resins, which was equipped with a stirrer, thermometer, reflux condensing tube and the like accessories, was charged with 30 parts of n-butyl acetate and 123 parts of the macromonomer (M-1) solution (solid content: 80 parts) as obtained in Production Example 1. The content was heated under stirring and maintained at 120° C., and into which a mixture formed of 10 parts of methyl methacrylate, 10 parts of 2-hydroxyethyl methacrylate, 0.5 part of azobisisobutyronitrile and 5 parts of n-butyl acetate was added dropwise over a period of 3 hours, followed by 30 minutes' aging at 120° C. Then an additional liquid catalyst mixture formed of 5 parts of n-butyl acetate and 0.5 part of azobisisobutyronitrile was added dropwise over a period of an hour. Thereafter the system was aged at 120° C. for an hour and cooled to provide a pigment dispersing resin (A-1) solution having a solid content of 55%. Thus obtained pigment dispersing resin (A-1) had a resin acid value of about 36 mgKOH/g and a weight-average molecular weight of about 6,000.

EXAMPLES 2–15 AND COMPARATIVE EXAMPLES 1–4

Example 1 was repeated except that the composition of the used components was varied for each run as shown in the following Table 2, to provide solutions of pigment dispersing resins (A-2) to (A-15) according to the present invention and pigment dispersing resins (AC-1) to (AC-4) as products for comparison. The solid contents of those solutions and resin acid values and weight-average molecular weights of those resins were as shown in the same Table 2.

EXAMPLE 16

An ordinary reaction vessel for producing acrylic resins, which was equipped with a stirrer, thermometer, a reflux condensing tube and the like accessories, was charged with 35 parts of n-butyl acetate and 38.5 parts of the macromonomer (M-9) solution (solid content: 25 parts) as obtained in Production Example 9, and the content was heated under stirring and maintained at 120° C. Into the system a mixture formed of 40 parts of methyl methacrylate, 10 parts of 2-hydroxyethyl methacrylate, 0.5 part of azobisisobutyronitrile and 5 parts of n-butyl acetate was added dropwise over a period of 3 hours. Aging the system for subsequent 30 minutes at 120° C., a mixture formed of 17.5 parts of n-butyl methacrylate, 7.5 parts of methacrylic acid, 0.5 part of azobisisobutyronitrile and 5 parts of n-butyl acetate was added dropwise over a period of 3 hours, followed by 30 minutes' aging at 120° C. Then an additional liquid catalyst mixture formed of 5 parts of n-butyl acetate and 0.5 part of azobisisobutyronitrile was added dropwise over a period of an hour. The system was aged at 120° C. for an hour and cooled to provide a pigment dispersing resin (A-16) solution (solid content 55%). Thus obtained pigment dispersing resin (A-16) had a resin acid value of about 49 mgKOH/g and a weight-average molecular weight of about 25,600.

EXAMPLE 17

Above Example 16 was repeated except that the composition of the used components was varied as shown in Table 2, to provide a pigment dispersing resin (A-17) solution. The solid content of this solution and the resin acid value and weight-average molecular weight of the same resin were as shown in Table 2.

The note in the following Table 2 has the following significance:

(note 2) Cardura E10: tradename, Japan Epoxy Resin Co., Ltd., glycidyl ester of $C_9$–$C_{11}$ branched higher fatty acid.

TABLE 2

| pigment dispersing resin solution | Example | | | | | | | | | |
|---|---|---|---|---|---|---|---|---|---|---|
| | 1 | 2 | 3 | 4 | 5 | 6 | 7 | 8 | 9 | 10 |
| | A-1 | A-2 | A-3 | A-4 | A-5 | A-6 | A-7 | A-8 | A-9 | A-10 |
| n-butyl acetate | 30 | 30 | 30 | 30 | 30 | 30 | 30 | 30 | 30 | 30 |
| Macromonomer kind | M-1 | M-2 | M-14 | M-3 | M-4 | M-5 | M-6 | M-7 | M-8 | M-3 |
| solution solid amount | 80 | 80 | 80 | 50 | 50 | 50 | 50 | 50 | 50 | 50 |
| methyl methacrylate | 10 | | | | | | | | | |
| ethyl methacrylate | | | | | | | 30 | | | |
| n-butyl methacrylate | | 14 | | 15 | | 30 | | | | |
| isobutyl methacrylate | | | | | | | | 30 | | |
| 2-ethylhexyl methacrylate | | | | | | | | | 30 | |
| lauryl methacrylate | | | | | | | | | | |
| 2-hyroxyethyl methacrylate | 10 | | | | | 10 | 10 | 10 | 10 | |
| Placcel FM-3X | | | | 25 | | | | | | |
| methacrylic acid | | 6 | 20 | | | | | | 5 | |
| dimethylaminoethyl methacrylate | | | | 10 | 50 | | | | 5 | |
| methacryloyloxyethylammonium chloride | | | | | | 10 | | | | |
| acidophosphoxyethyl methacrylate | | | | | | | 10 | | | |
| 2-acrylamido-2-methylpropanesulfonic acid | | | | | | | | 10 | | |
| glycidyl methacrylate | | | | | | | | | | |
| n-butyl acrylate | | | | | | | | | | 43.5 |
| acrylic acid | | | | | | | | | | 6.5 |
| azobisisobutyronitrile | 0.5 | 0.5 | 0.5 | 0.5 | 0.5 | 0.5 | 0.5 | 0.5 | 0.5 | 0.2 |
| n-butyl acetate | 5 | 5 | 5 | 5 | 5 | 5 | 5 | 5 | 5 | 5 |
| n-butyl acetate | 5 | 5 | 5 | 5 | 5 | 5 | 5 | 5 | 5 | 5 |
| azobisisobutyronitrile | 0.5 | 0.5 | 0.5 | 0.5 | 0.5 | 0.5 | 0.5 | 0.5 | 0.5 | 0.5 |
| solid content (%) | 55 | 55 | 55 | 55 | 55 | 55 | 55 | 55 | 55 | 55 |
| resin acid value (mgKOH/g) | 36 | 39 | 130 | 0 | 0 | 0 | 53 | 30 | 16 | 50 |
| weight-average molecular weight | 6000 | 6500 | 6300 | 10000 | 9600 | 12400 | 24600 | 16600 | 21600 | 50000 |

| pigment dispersing resin solution | Example | | | | | Comparative Example | | | |
|---|---|---|---|---|---|---|---|---|---|
| | 11 | 12 | 13 | 14 | 15 | 1 | 2 | 3 | 4 |
| | A-11 | A-12 | A-13 | A-14 | A-15 | AC-1 | AC-2 | AC-3 | AC-4 |
| n-butyl acetate | 30 | 30 | 30 | 30 | 30 | 60 | 60 | 60 | 60 |
| Macromonomer kind | M-3 | M-11 | M-12 | M-8 | M-13 | — | — | — | — |
| solution solid amount | 50 | 50 | 70 | 80 | 50 | — | — | — | — |
| methyl methacrylate | | | | | | 10 | | | 40 |
| ethyl methacrylate | | | | | | | | | |
| n-butyl methacrylate | | | 14 | 3 | 15 | 74 | 15 | | 17.5 |
| isobutyl methacrylate | | 25 | | | | | 40 | 10 | |
| 2-ethylhexyl methacrylate | | | | | | | | | |
| lauryl methacrylate | | | | | | | | | 15 |
| 2-hyroxyethyl methacrylate | | | | | | 10 | 10 | | 20 |
| Placcel FM-3X | | | | | 25 | | | 25 | 40 |
| methacrylic acid | | | 6 | | | 6 | | | 7.5 |
| dimethylaminoethyl methacrylate | | | | | 10 | | 10 | | |
| glycidyl methacrylate | | | | 10 | | | | | |
| n-butyl acrylate | 43.5 | 7.5 | | | | | | 43.5 | |
| acrylic acid | 6.5 | 7.5 | | | | | | 6.5 | |
| 2-hydroxyethyl acrylate | | | 10 | | | | | | |
| Cardura E10 (note 2) | | | | 10 | | | | | |
| sodium hydrogensulfite | | | | | 7 | | | | |
| azobisisobutyronitrile | 2.0 | 0.5 | 0.5 | 0.5 | 0.5 | 2 | 2 | 2 | 2 |
| n-butyl acetate | 5 | 5 | 5 | 5 | 5 | 5 | 5 | 5 | 5 |
| n-butyl acetate | 5 | 5 | 5 | 5 | 5 | 5 | 5 | 5 | 5 |
| azobisisobutyronitrile | 0.5 | 0.5 | 0.5 | 0.5 | 0.5 | 0.5 | 0.5 | 0.5 | 0.5 |
| solid content (%) | 55 | 55 | 55 | 55 | 55 | 55 | 55 | 55 | 55 |
| resin acid value (mgKOH/g) | 50 | 45 | 40 | 0 | 0 | 39 | 36 | 49 | 50 |
| weight-average molecular weight | 13900 | 9000 | 13900 | 13500 | 10500 | 20000 | 20000 | 20000 | 20000 |

| pigment dispersing resin solution | Example | |
|---|---|---|
| | 16 | 17 |
| | A-16 | A-17 |
| n-butyl acetate | 35 | 35 |
| Macromonomer kind | M-9 | M-10 |
| solution solid amount | 25 | 25 |
| methyl methacrylate | 40 | 15 |
| 2-hyroxyethyl methacrylate | 10 | 10 |
| azobisisobutyronitrile | 0.5 | 0.5 |
| n-butyl acetate | 5 | 5 |
| methyl methacrylate | | |
| n-butyl methacrylate | | 17.5 |

TABLE 2-continued

|  |  |
|---|---|
| 2-ethylhexyl methacrylate |  | 19 |
| 2-hyroxyethyl methacrylate |  | 5 |
| Methacrylic acid | 7.5 | 6 |
| azobisisobutyronitrile | 0.5 | 0.5 |
| n-butyl acetate | 5 | 5 |
| n-butyl acetate | 5 | 5 |
| azobisisobutyronitrile | 0.5 | 0.5 |
| solid content (%) | 55 | 55 |
| resin acid value (mgKOH/g) | 49 | 49 |
| weight-average molecular weight | 25600 | 18000 |

Preparation of Pigment Dispersions

EXAMPLES 18–41 AND COMPARATIVE EXAMPLES 5–8

Using those pigment dispersing resin solutions as obtained in above Examples 1–17 and Comparative Examples 1–4, pigments and mixed solvent, the components of the respective amounts as specified in the following Table 3 were put in a wide-mouthed glass bottle of 225 cc in capacity, to which about 1.3 mmφ glass beads were added as a dispersion medium. Hermetically sealing the glass bottle, each of its content was dispersed with a paint shaker for 4 hours to provide pigment dispersions (B-1)–(B-24) and (BC-1)–(BC-4).

Notes in Table 3 has the following significations:
(note 3) FTX: Ciba Specialty Chemicals Co., Ltd., an organic red pigment sold under a tradename of "IRGAZIN DPP Rubine FTX".
(note 4) RT 355D: Ciba Specialty Chemicals Co., Ltd., an organic red pigment sold under a tradename of "Cinquasia Mazenta RT355D"
(note 5) G314: Sanyo Color Works, Ltd. an organic blue pigment sold under a tradename of "Cyanine Blue G314".

Those pigment dispersions obtained in above Examples 18–41 and Comparative Example 5–8 were subjected to performance tests based on the following test methods. The results were as given in later appearing Table 3.

Test Methods

Coating Appearance:

Each pigment dispersion was applied onto a 100×200 mm transparent PET film piece with a bar coater, to a dry film, thickness of 15 μm, and baked at 140° C. for 30 minutes. Turbidity level of the coating formed on the film was visually evaluated according to the following criteria:

○: coating was uniform and completely free of turbidity

Δ: a little turbidity was observed

X: considerable turbidity was observed.

Gloss:

Following JIS K5400 7.6 (1990), refrectance of each coating was measured, when incident angle and light receiving angles are both 60 degree.

Transparency:

Using a haze meter (COH-300), % light transmission was determined following the equation:

light transmission (%)=100×[1−(scattered light intensity/irradiated light intensity)]

Viscoelastic Properties:

Viscosity [Pascal·second (Pa·sec.)] and yield value (dyne/cm$^2$) were measured with Viscoelastometer "MR-300" (Rheology Co.)

TABLE 3

| | | Example | | | | | | | | | | | | | |
|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 |
| Pigment dispersion | | B-1 | B-2 | B-3 | B-4 | B-5 | B-6 | B-7 | B-8 | B-9 | B-10 | B-11 | B-12 | B-13 | B-14 |
| acrylic resin solution | kind | A-1 | A-2 | A-2 | A-3 | A-4 | A-4 | A-5 | A-5 | A-6 | A-6 | A-7 | A-7 | A-8 | A-8 |
| | amount | 181.8 | 181.8 | 181.8 | 181.8 | 181.8 | 181.8 | 181.8 | 181.8 | 181.8 | 181.8 | 181.8 | 181.8 | 181.8 | 181.8 |
| pigment | FTX (note 3) | 100 | 100 | | 100 | 100 | | 100 | | | | 100 | | 100 | |
| | RT3550 (note 4) | | | 100 | | | 100 | | 100 | 100 | | | 100 | | 100 |
| | G314 (note 5) | | | | | | | | | | 100 | | | | |
| toluene | | 80 | 80 | 80 | 80 | 80 | 80 | 80 | 80 | 80 | 80 | 80 | 80 | 80 | 80 |
| 3-methoxybutyl acetate | | 20 | 20 | 20 | 20 | 20 | 20 | 20 | 20 | 20 | 20 | 20 | 20 | 20 | 20 |
| Test results | coating appearance | ○ | ○ | ○ | ○ | ○ | ○ | ○ | ○ | ○ | ○ | ○ | ○ | ○ | ○ |
| | gloss (60°) | 95 | 101 | 96 | 98 | 92 | 99 | 98 | 99 | 95 | 99 | 98 | 98 | 98 | 98 |
| | light transmission (%) | 83 | 86 | 90 | 87 | 88 | 91 | 84 | 90 | 90 | 85 | 87 | 90 | 88 | 89 |
| | viscosity (Pa·sec.) | 0.39 | 0.32 | 0.18 | 0.35 | 0.33 | 0.12 | 0.29 | 0.12 | 0.14 | 0.41 | 0.29 | 0.15 | 0.29 | 0.10 |
| | yield value (dyne/cm$^2$) | 3.5 | 2.9 | 2.6 | 3.2 | 3.3 | 2.1 | 3.6 | 1.9 | 2.2 | 2.5 | 3.8 | 2.3 | 2.9 | 1.8 |

TABLE 3-continued

| Pigment dispersion | | 32<br>B-15 | 33<br>B-16 | 34<br>B-17 | 35<br>B-18 | 36<br>B-19 | 37<br>B-20 | 38<br>B-21 | 39<br>B-22 | 40<br>B-23 | 41<br>B-24 | 5<br>BC-1 | 6<br>BC-2 | 7<br>BC-3 | 8<br>BC-4 |
|---|---|---|---|---|---|---|---|---|---|---|---|---|---|---|---|
| acrylic resin solution | kind | A-9 | A-9 | A-10 | A-11 | A-12 | A-13 | A-14 | A-15 | A-16 | A-17 | AC-1 | AC-2 | AC-3 | AC-4 |
| | amount | 18.1 | 18.1 | 181.8 | 181.8 | 181.8 | 181.8 | 181.8 | 181.8 | 181.8 | 181.8 | 181.8 | 181.8 | 181.8 | 181.8 |
| pigment | FTX (note 3) | 100 | | 100 | 100 | 100 | 100 | | 100 | 100 | 100 | 100 | 100 | | 100 |
| | RT3550 (note 4) | | 100 | | | | | 100 | | | | | | 100 | |
| | G314 (note 5) | | | | | | | | | | | | | | |
| toluene | | 80 | 80 | 80 | 80 | 80 | 80 | 80 | 80 | 80 | 80 | 80 | 80 | 80 | 80 |
| 3-methoxybutyl acetate | | 20 | 20 | 20 | 20 | 20 | 20 | 20 | 20 | 20 | 20 | 20 | 20 | 20 | 20 |
| Test results | coating appearance | ○ | ○ | ○ | ○ | ○ | ○ | ○ | ○ | ○ | ○ | X | X | X | X |
| | gloss (60°) | 94 | 94 | 97 | 98 | 98 | 100 | 92 | 93 | 100 | 92 | 65 | 70 | 70 | 70 |
| | light transmission (%) | 87 | 89 | 82 | 86 | 88 | 89 | 90 | 90 | 89 | 84 | 35 | 40 | 40 | 40 |
| | viscosity (Pa-sec.) | 0.39 | 0.15 | 0.31 | 0.32 | 0.32 | 0.33 | 0.16 | 0.32 | 0.31 | 0.36 | 1.55 | 2.00 | 1.40 | 1.20 |
| | yield value (dyne/cm$^2$) | 3.2 | 2.3 | 3.3 | 3.4 | 3.3 | 3.2 | 2.3 | 3.3 | 3.4 | 3.1 | 16.0 | 20.0 | 15.0 | 12.0 |

Synthesis of Resins for Paints

SYNTHESIS EXAMPLE 1

A reaction vessel for producing acrylic resins, which was equipped with a stirrer, thermometer, reflux condensing tube and the like accessories, was charged with 30 parts of Swasol™ 1000 (Cosmo Oil Co., Ltd., aromatic hydrocarbon solvent) and 5 parts of n-butyl alcohol, which were heated under stirring. When the temperature reached 130° C., a mixture of the following monomers, etc. was added dropwise over a period of 3 hours:

| | |
|---|---|
| styrene | 20 parts |
| methyl methacrylate | 50 parts |
| n-butyl acrylate | 15 parts |
| 2-hydroxyethyl methacrylate | 15 parts |
| 2,2'-azobisisobutyronitrile | 5 parts |
| n-butyl alcohol | 5 parts |

After the dropwise addition of said mixture was completed, the system was maintained at 130° C. for further 30 minutes, followed by further dropwise addition of an additional catalyst solution which was a mixture of 0.5 part of 2,2'-azobisisobutyronitrile and 8 parts of Swasol™ 1000 over a period of an hour. Stirring at 130° C. was continued then for an hour, and the system was cooled. Diluting this system with 8 parts of n-butyl alcohol, an acrylic polymer solution (AP-1) having a solid concentration of 60% was obtained.

SYNTHESIS EXAMPLE 2

Synthesis Example 1 was repeated except that the composition of the monomeric mixture for dropwise addition was changed to that as specified in later appearing Table 4, to synthesize an acrylic polymer solution (AP-2) having a solid concentration of 60%.

SYNTHESIS EXAMPLE 3

Synthesis Example 1 was repeated except that the composition of the monomeric mixture for dropwise addition was changed to that as specified in later appearing Table 4, and the reaction temperature and aging temperature was changed from 130° C. to 120° C. Thus a glycidyl-containing acrylic polymer solution (GP-1) having a solid concentration of 60% was synthesized.

SYNTHESIS EXAMPLE 4

A reaction vessel for producing acrylic resins, equipped with a stirrer, thermometer, a reflux condenser and the like accessories was charged with 40 parts of xylene and 15 parts of 3-methoxybutyl acetate, which were heated under stirring until the temperature reached 125° C. Then a mixture of monomers, etc. as later specified in Table 4 was added dropwise over a period of 4 hours, and after the addition was completed, maintained at 125° C. for further 30 minutes. Then an additional catalyst solution which was a mixture of 0.5 part of 2,2'-azobisisobutyronitrile and 15 parts of 3-methoxybutyl acetate was added dropwise over a period of an hour. Stirring was continued for another hour at 125° C., and the system was cooled to provide a high acid value acrylic polymer solution (CP-1) having a solid concentration of 60%.

Resin characteristics of those acrylic polymers as obtained in above synthesis examples 1–4 also are shown in the following Table 4.

TABLE 4

| | Synthesis Example No. | | | |
|---|---|---|---|---|
| | 1 | 2 | 3 | 4 |
| acrylic polymer solution | AP-1 | AP-2 | GP-1 | GP-1 |
| styrene | 20 | 20 | 45 | 5 |
| methyl methacrylate | 50 | 45 | | |
| n-butyl acrylate | 15 | | 10 | |
| n-butyl methacrylate | | 15 | | 30 |
| isobutyl methacrylate | | | | 24 |
| lauryl methacrylate | | | | 25 |
| 2-hydroxyethyl methacrylate | 15 | | 15 | |
| 2-hydroxyethyl acrylate | | 20 | | |
| glycidyl methacrylate | | | 30 | |
| methacrylic acid | | | | 6 |
| acrylic acid | | | | 10 |

TABLE 4-continued

| | Synthesis Example No. | | | |
|---|---|---|---|---|
| | 1 | 2 | 3 | 4 |
| acrylic polymer solution | AP-1 | AP-2 | GP-1 | GP-1 |
| 2,2'-azobisisobutyronitrile | 5 | 4 | 5 | 5 |
| n-butanol | 5 | 5 | 5 | |
| glass-transition temperature (° C.) | 60 | 42 | 54 | 14 |
| hydroxyl value (mgKOH/g) | 65 | 97 | 65 | |
| acid value (mgKOH/g) | | | | 117 |
| epoxy equivalent (g/equivalent) | | | 473 | |

SYNTHESIS EXAMPLE 5

A reaction vessel equipped with a stirrer, thermometer, rectification column, nitrogen inlet pipe, a reflux condenser and the like accessories was charged with 2.4 moles of isophthalic acid, 4.8 moles of hexahydrophthalic acid, 2.7 moles of adipic acid, 5.1 moles of neopentyl glycol, 3.3 moles of 1,6-hexanediol and 2.5 moles of trimethylolpropane, which were heated under stirring until 160° C., and then further gradually heated to 240° C. over a period of 3 hours, followed by 1.5 hours' aging. The rectification column was switched to reflux condenser, 1.4 moles of xylene was introduced, and the reaction was conducted under reflux for 12 hours at 240° C. Adding Swasol™ 1000 (Cosmo Oil Co., Ltd., an aromatic hydrocarbon solvent), a polyester polymer solution (PP-1) having a solid concentration of 60% was obtained.

SYNTHESIS EXAMPLE 6

Synthesis Example 5 was repeated except that the starting materials used were changed to those indicated in the following Table 5, to provide a polyester polymer solution (PP-2) having a solid concentration of 60%. Resin characteristic property values of the polyester polymers obtained in Synthesis Examples 5 and 6 are shown in the following Table 5.

TABLE 5

| | Synthesis Example | |
|---|---|---|
| | 5 | 6 |
| polyester polymer solution | PP-1 | PP-2 |
| isophthalic acid | 2.4 | 1.6 |
| hexahydrophthalic acid | 4.8 | 4.4 |
| adipic acid | 2.7 | 4.0 |
| neopentyl glycol | 5.1 | 1.1 |
| 1,6-hexanediol | 3.3 | 7.6 |
| trimethylolpropane | 2.5 | 2.2 |
| Glass transition temperature (° C.) | −22.8 | −46.1 |
| acid value (mgKOH/g) | 4 | 4 |
| hydroxyl value (mgKOH/g) | 98 | 90 |

Preparation of Coloring Paint Compositions

EXAMPLE 42

Mixing 115 parts (solid content: 60 parts) of the pigment dispersion paste (B-1) as obtained in Example 18, 300 parts (solid content: 180 parts) of the acrylic polymer solution (AP-2) as obtained in Synthesis Example 1; 85.7 parts (solid content: 60 parts) of Nikalac™ MS25 (Sanwa Chemical Co., Ltd., a butyl-etherified melamine resin solution having a solid content of about 70%); 1.1 parts of Nacure™ 5225 (U.S. King Industries, Ltd., a curing catalyst solution which is a solution of amine-neutralized sulfonic acid compound; active ingredient 25%) and 1.4 parts of Disparlon™ LC-955 (Kusumoto Chemicals, Ltd., a surface-regulating agent), a coloring paint composition was obtained.

EXAMPLES 43–66 AND COMPARATIVE EXAMPLES 9–12

Example 42 was repeated except that the compositions of the blend was varied to those indicated in the later appearing Table 6, to provide respective coloring paint compositions.

Notes in Table 7 each has the following significance:
(note 6) Desmodur™ N3500: Sumika Bayer Urethane Co. Ltd., a blocked isocyanate compound
(note 7) TBAB: tetrabutylammonium bromide.

Using those coloring pigment compositions obtained in Examples 42–66 and Comparative Examples 9–12, test panels were prepared following the hereinafter described preparation of test panels.

Preparation of Test Panels

A 0.8 mm-thick cold rolled dull steel sheet which had been chemically treated with zinc phosphate was applied with an epoxy resin-based cationic electrodeposition paint to a dry film thickness of about 20 μm which was subsequently baked. Onto this electrodeposited paint film, automotive polyester resin-based inter coating paint was applied to a dry film thickness of about 20 μm and baked. This coated steel sheet was wet sanded with #400 sand paper, dried off and degreased with petroleum benzine. Onto so degreased coat surface each of the coloring paint compositions whose viscosity was adjusted to 25 seconds (Ford cup #4/25° C.) was applied to a dry film thickness of about 40 μm, and allowed to stand at room temperature for about 3 minutes for setting. Each of the paint film was then baked with an electric convection oven at 140° C. for 30 minutes, to provide a test panel.

Thus prepared test panels were subjected to various tests by the following test methods, with the results as given in Table 6.

Test Methods

Coating Appearance:
The appearance of coating film was synthetically examined in respect of glossy appearance and fatness, and evaluated by a three grading system as follows:
○; good, Δ; poor, X; very poor.

Adhesion:
Following JIS K-5400 8.5.2 (1990) lattice pattern tape method, each eleven parallel straight lines were orthogonally drawn vertically and horizontally at 1 mm intervals on the top coat film surface on each test panel to the depth reaching the substrate, to form one hundred 1 mm×1 mm squares. Onto the same surface cellophane adhesive tape was applied intimately. The tape was then rapidly peeled off and the extent of peeling of the squares was observed. Evaluation of adhesion was given by a three-grade system as follows:
○; at least 90 squares of the coat film remained unpeeled;
Δ; no less than 50 but less than 90 squares remained unpeeled;
X; less than 50 squares remained unpeeled.

Acid Resistance:
An artificial rain (0.5 cc) of the following composition was dropped onto each of the test panels which were heated on 80° C. hot plate for 30 minutes and then washed with water. The coated surfaces were visually examined and evaluated according to the following grading standards:

○; no change observed on the coated surface;

Δ; no whitening or swelling observed on the coated surface but difference in level was recognized at the boundaries; and X; whitening or swelling observed on the coated surface.

The artificial rain used was a blend of 1 mg/g aqueous $NaNO_3$ solution, 19.6 g; 1 mg/g aqueous $KNO_3$ solution, 5.2 g; 1 mg/g aqueous $CaCl_2.2H_2O$ solution, 3.7 g; 1 mg/g aqueous $MgSO_4.7H_2O$ solution, 8.2 g; 1 mg/g aqueous $(NH_4)_2SO_4$ solution, 73.3 g; 0.1 N aqueous $H_2SO_4$ solution, 30.0 g; 0.1 N aqueous $HNO_3$ solution, 20.0 g; 0.05 N aqueous HCl solution, 10.0 g and 1 mg/g aqueous NaF solution, 4.7 g. The pH of the blend was adjusted to 1.0 with $H_2SO_4$.

Solvent Resistance:

In a 20° C. room, each test panel surface was rubbed with a piece of cotton gauze soaked with methyl ethyl ketone under about 1 kg/cm$^2$ load over a length of about 5 cm. After 50 times reciprocal rubbing, the surface condition of the test panel was visually graded according to the following standard:

○; no change observed on the coated surface;

Δ; scratches observed on the coated surface; and

X; whitening or swelling observed on the coated surface.

Impact Resistance:

Following JIS K-5400 8.3.2 (1990) DuPont impact resistance test, a weight of 500 g with its hitting front end having a diameter of about 12.7 mm was dropped on the coated film surface facing upward, and the maximum height of the dropped weight without damaging the coated film was measured, the maximum tested distance being 50 cm.

TABLE 6

| | | Example | | | | | | | | | | | | | | |
|---|---|---|---|---|---|---|---|---|---|---|---|---|---|---|---|---|
| | | 42 | 43 | 44 | 45 | 46 | 47 | 48 | 49 | 50 | 51 | 52 | 53 | 54 | 55 | 56 |
| pigment dispersion paste | kind | B-1 | B-1 | B-2 | B-3 | B-4 | B-5 | B-6 | B-7 | B-8 | B-9 | B-10 | B-11 | B-12 | B-13 | B-14 |
| | amount | 115 | 115 | 115 | 115 | 115 | 115 | 115 | 115 | 115 | 115 | 115 | 115 | 115 | 115 | 115 |
| acrylic polymer solution | AP-1 | | 150 | | 150 | | | 150 | 150 | | | | | 150 | 150 | 150 |
| | AP-2 | 300 | | 150 | | 150 | | | | 300 | 150 | 150 | 150 | | | |
| | GP-1 | | | | | | 120 | | | | | | | | | |
| | CP-1 | | | | | | 180 | | | | | | | | | |
| polyester polymer solution | PP-1 | | 150 | | | 150 | | | 150 | | 150 | | | 150 | 150 | 150 |
| | PP-2 | | | 150 | 150 | | | 150 | | | | 150 | | | | |
| Nikalac MS 25 | | 85.7 | 85.7 | 85.7 | 85.7 | 85.7 | | | 85.7 | 85.7 | | 85.7 | 85.7 | | 85.7 | 85.7 |
| Desmodur N 3500 (note 6) | | | | | | | | 45.3 | | | 45.3 | | | 45.3 | | |
| Necure 5225 | | 1.1 | 1.1 | 1.1 | 1.1 | 1.1 | | | 1.1 | 1.1 | | 1.1 | 1.1 | | 1.1 | 1.1 |
| Disparlon LC-955 | | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| TBAB (note 7) | | | | | | | 1.2 | | | | | | | | | |
| Test result | coating appearance | ○ | ○ | ○ | ○ | ○ | ○ | ○ | ○ | ○ | ○ | ○ | ○ | ○ | ○ | ○ |
| | adhesion | ○ | ○ | ○ | ○ | ○ | ○ | ○ | ○ | ○ | ○ | ○ | ○ | ○ | ○ | ○ |
| | acid resistance | ○ | ○ | ○ | ○ | ○ | ○ | ○ | ○ | ○ | ○ | ○ | ○ | ○ | ○ | ○ |
| | solvent resistance | ○ | ○ | ○ | ○ | ○ | ○ | ○ | ○ | ○ | ○ | ○ | ○ | ○ | ○ | ○ |
| | impact resistance | 50 | 50 | 50 | 50 | 50 | 50 | 50 | 50 | 50 | 50 | 50 | 50 | 50 | 50 | 50 |

| | | Example | | | | | | | | | | Comparative Example | | | |
|---|---|---|---|---|---|---|---|---|---|---|---|---|---|---|---|
| | | 57 | 58 | 59 | 60 | 61 | 62 | 63 | 64 | 65 | 66 | 9 | 10 | 11 | 12 |
| pigment dispersion paste | kind | B-15 | B-16 | B-17 | B-18 | B-19 | B-20 | B-21 | B-22 | B-23 | B-24 | B-1 | B-1 | B-2 | B-3 |
| | amount | 115 | 115 | 115 | 115 | 115 | 115 | 115 | 115 | 115 | 115 | 115 | 115 | 115 | 115 |
| acrylic polymer solution | AP-1 | 150 | | 150 | | 150 | 150 | 150 | | 150 | 150 | | 150 | | 150 |
| | AP-2 | | | | 150 | | | | 150 | | | 300 | | 150 | |
| | GP-1 | | 120 | | | | | | | | | | | | |
| | CP-1 | | 180 | | | 85.7 | | | | | | | | | |
| polyester polymer solution | PP-1 | 150 | | | | | 150 | 150 | 150 | 150 | 150 | | 150 | | |
| | PP-2 | | | | 150 | | | | | | | | | 150 | 150 |
| Nikalac MS 25 | | 85.7 | | 85.7 | | | | | 85.7 | | | 85.7 | 85.7 | 85.7 | 85.7 |
| Desmodur N 3500 (note 6) | | | | | | | | | | | | | | | |
| Necure 5225 | | 1.1 | | 1.1 | 1.1 | 1.1 | 1.1 | 1.1 | 1.1 | 1.1 | 1.1 | 1.1 | 1.1 | 1.1 | 1.1 |
| Disparlon LC-955 | | 1.4 | 1.4 | 1.4 | 1.4 | 1.4 | 1.4 | 1.4 | 1.4 | 1.4 | 1.4 | 1.4 | 1.4 | 1.4 | 1.4 |
| TBAB (note 7) | | | 1.2 | | | | | | | | | | | | |
| Test result | coating appearance | ○ | ○ | ○ | ○ | ○ | ○ | ○ | ○ | ○ | ○ | X | X | X | X |
| | adhesion | ○ | ○ | ○ | ○ | ○ | ○ | ○ | ○ | ○ | ○ | X | X | X | X |
| | acid resistance | ○ | ○ | ○ | ○ | ○ | ○ | ○ | ○ | ○ | ○ | X | X | X | X |
| | solvent | ○ | ○ | ○ | ○ | ○ | ○ | ○ | ○ | ○ | ○ | X | X | X | X |

TABLE 6-continued

| | | | | | | | | | | | | | | |
|---|---|---|---|---|---|---|---|---|---|---|---|---|---|---|
| resistance impact resistance | 50 | 50 | 50 | 50 | 50 | 50 | 50 | 50 | 50 | 50 | 35 | 35 | 30 | 35 |

Use of pigment dispersing resins of the present invention makes it possible to provide pigment dispersions excelling in wetting property and dispersion stability and showing low viscosity even at high pigment concentration, and also excelling in color-developing property. Furthermore, by using the pigment dispersions, paint compositions excelling in color developing ability of pigments, finished appearance of coating film and coated film performance such as weatherability and physical properties, while exhibiting good pigment dispersion stability to allow higher pigment concentration can be provided.

What is claimed is:

1. A pigment dispersing resin having a weight-average molecular weight within a range of 1,000–150,000, which is obtained by copolymerizing a monomeric mixture comprising
   (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and
   (b) at least one copolymerizable unsaturated monomer,
   wherein at least one monomer among the ethylenically unsaturated monomer(s) constituting said macromonomer (a) and the copolymerizable unsaturated monomer (s) (b) has a functional group selected from substituted or unsubstituted amino group, quaternary ammonium salt group, sulfonic group, phosphoric group and carboxyl group.

2. A pigment dispersing resin having a weight-average molecular weight within a range of 1,000–150,000, which is obtained by copolymerizing a monomeric mixture comprising
   (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and
   (b) at least one copolymerizable unsaturated monomer,
   wherein at least one monomer among the ethylenically unsaturated monomer(s) constituting said macromonomer (a) and the copolymerizable unsaturated monomer (s) (b) has a group which is convertible to a functional group selected from substituted or unsubstituted amino group, quaternary ammonium salt group, sulfonic group, phosphoric group and carboxyl group,
   and then converting said convertible groups in the formed resin to corresponding functional groups.

3. A pigment dispersing resin according to claim 1, in which at least one monomer among the ethylenically unsaturated monomer(s) constituting said macromonomer (a) and the copolymerizable unsaturated monomer(s) (b) contains carboxyl group.

4. A pigment dispersing resin according to claim 2, in which at least one monomer among the ethylenically unsaturated monomer(s) constituting said macromonomer (a) and the copolymerizable unsaturated monomer(s) (b) contains a group which is convertible to carboxyl group.

5. A pigment dispersing resin according to claim 1 or 2, in which the ethylenically unsaturated monomer(s) constituting said macromonomer (a) and the copolymerizable unsaturated monomer(s) (b) are $C_1$–$C_{24}$ alkyl esters of methacrylic acid.

6. A pigment dispersing resin according to claim 1 or 2, in which the metal complex as a catalytic chain transfer agent is a cobalt complex represented by the following formula,

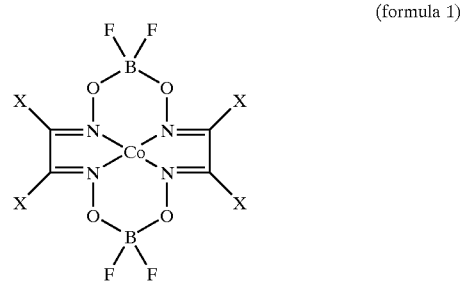

(formula 1)

in which four X's are same or different and each stands for hydrogen atom or a $C_1$–$C_{10}$ hydrocarbon group, or two X's binding to adjacent carbons may form, together with said adjacent carbons, a $C_4$–$C_{20}$ hydrocarbon ring.

7. A pigment dispersing resin according to claim 1 or 2, in which the addition-cleavage type chain transfer agent is 2,4-diphenyl-4-methyl-1-pentene.

8. A pigment dispersing resin according to claim 1 or 2, in which the macromonomer (a) has a weight-average molecular weight within a range of 300–15,000.

9. A pigment dispersing resin according to claim 1 or 2, in which the copolymerization reaction is conducted by a solution polymerization method.

10. A pigment dispersing resin according to claim 1 or 2, in which the monomeric mixture comprises, based on the combined weight of the macromonomer (a) and copolymerizable unsaturated monomer(s) (b), 0.1–99.9% by weight of the macromonomer (a) and 0.1–99.9% by weight of the copolymerizable unsaturated monomer(s) (b).

11. A pigment dispersing resin according to claim 2 wherein the group, which is convertible to a functional group selected from substituted or unsubstituted amino group, quaternary ammonium salt group sulfonic group, phosphoric group and carboxyl group, is epoxy group or hydroxyl group.

12. A pigment dispersing resin according to claim 1 or 2, which contains functional group(s) selected from substituted or unsubstituted amino group, quaternary ammonium salt group, sulfonic group, phosphoric group and carboxyl group, within a range of 0.01–10 equivalents/kg resin.

13. A pigment dispersing resin according to claim 1 or 2, which has an weight-average molecular weight within a range of 2,000–100,000.

14. A pigment dispersing resin containing long chain alkyl groups, which is obtained by introducing long chain alkyl groups into the pigment dispersing resin according to claim 1 or 2.

15. A long chain alkyl-containing pigment dispersing resin having a weight-average molecular weight within a range of 1,000–150,000, which is obtained by copolymerizing a monomeric mixture comprising.
- (c) a long chain alkyl group-containing macromonomer having a resin acid value less than 50 mgKOH/g, which is obtained by either subjecting a carboxyl-containing macromonomer and an epoxy-containing long chain alkyl compound to an esterification reaction, said carboxyl-containing macromonomer being obtained by copolymerizing a monomeric mixture comprising a carboxyl-containing unsaturated monomer and at least one other ethylenically unsaturated monomer in the presence of a metal complex as a catalytic chain transfer agent, or an addition cleavage-type chain transfer agent and if necessary a radical polymerization initiator; or by causing an epoxy-containing long chain alkyl compound to be concurrently present in said copolymerization reaction system to effect the copolymerization reaction and the esterification reaction at the same time, and
- (b) at least one copolymerizable unsaturated monomer, wherein at least one monomer among said macromonomer (c) and copolymerizable unsaturated monomer(s) (b) has a functional group selected from substituted or unsubstituted amino group, quaternary ammonium salt group, sulfonic group, phosphoric group and carboxyl group.

16. A pigment dispersing resin according to claim 14, in which the long chain alkyl group is $C_6$–$C_{24}$.

17. A pigment dispersing resin according to claim 14, which contains 1–30 parts by weight of the long chain alkyl group per 100 parts by weight of solid content of the pigment dispersing resin.

18. A pigment dispersing resin according to claim 14, which contains functional group(s) selected from substituted or unsubstituted amino group, quaternary ammonium salt group, sulfonic group, phosphoric group and carboxyl group.

19. A pigment dispersing resin according to claim 14, which has a weight-average molecular weight within a range of 2,000–100,000.

20. A pigment dispersion which comprises a pigment dispersing resin according to claim 1, pigment, solvent and if necessary dispersion assistant.

21. A paint composition which contains a pigment dispersion according to claim 20.

22. A pigment dispersing resin according to claim 15, in which the long chain alkyl group is $C_6$–$C_{24}$.

23. A pigment dispersing resin according to claim 15; which contains 1–30 parts by weight of the long chain alkyl group per 100 parts by weight of solid content of the pigment dispersing resin.

24. A pigment dispersing resin according to claim 15, which contains functional group(s) selected from substituted or unsubstituted amino group, quaternary ammonium salt group, sulfonic group, phosphoric group and carboxyl group.

25. A pigment dispersing resin according to claim 15, which has a weight-average molecular weight within a range of 2,000–100,000.

26. The pigment dispersing resin according to claim 16 wherein the long chain alkyl group is a $C_8$–$C_{20}$ linear or branched alkyl group.

27. The pigment dispersing resin according to claim 18 wherein the combined concentration of said functional groups is within a range of 0.01–10 equivalents/kg of resin.

28. The pigment dispersing resin according to claim 22 wherein the long chain alkyl group is a $C_8$–$C_{20}$ linear or branched chain alkyl group.

29. The pigment dispersing resin according to claim 24 wherein the combined concentration of said functional groups is within a range of 0.01–10 equivalents/kg of resin.

* * * * *